Feb. 16, 1943. O. G. SALB ET AL 2,311,416
PICKUP FOR DETECTING AND TRANSLATING VIBRATIONS
Original Filed July 17, 1939

Inventors.
Oscar G. Salb
Ralph E. Sturm
By
Williams, Bradbury & Hinkle
Attys.

Patented Feb. 16, 1943

2,311,416

UNITED STATES PATENT OFFICE 2,311,416

PICKUP FOR DETECTING AND TRANSLATING VIBRATIONS

Oscar G. Salb, Indianapolis, Ind., and Ralph E. Sturm, Milton, Wis.

Original application July 17, 1939, Serial No. 285,028. Divided and this application January 6, 1941, Serial No. 373,238

2 Claims. (Cl. 181—24)

Our invention relates to pick-ups for detecting and translating vibrations—in other words to an instrument which is affected by vibratory movements and converts the same into electrical phenomena, e. g., e lectrical waves.

It will be shown and described as embodied in an instrument particularly adapted to detect, at the chest wall, vibrations emanating from the heart, and translating them into corresponding electrical waves which may be amplified and converted into visual indications by such equipment as set forth in our application Serial No. 285,028, filed July 17, 1939—of which application this application is a division.

One of the objects of our invention is to provide an improved pick-up.

Another object is to provide a pick-up which will respond reliably to heart vibrations which are both within and without the audible frequency ranges.

Another object is to provide a pick-up which will be unaffected by variations in the pressure at which it may be applied to the chest wall.

A further object is to provide a pick-up which will be sensitive to vibrations of low magnitude and frequency but insensitive to extraneous disturbances.

Other objects and advantages will hereinafter appear.

Figure 1:
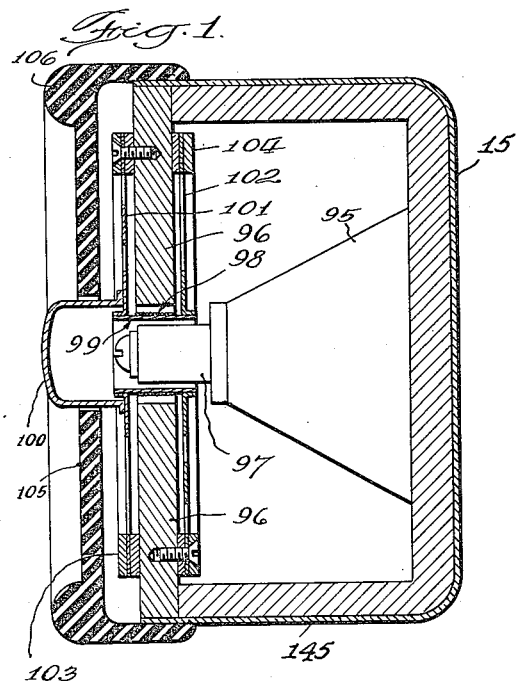
Fig. 1 is a vertical mid cross-section.

The pick-up is designated generally at 15 and comprises a protective casing 145 having therein a permanent magnet 95 with poles 96 and 97. Suspended in the air gap between these poles is a coil 98 carried by a cylindrical form 99 to which is attached in a suitable manner, such as by cement, a body contact button 100. This button 100 may be made of any suitable material, such as metal or artificial resins, and should be of light weight.

Button 100, coil form 99 and coil 98 are connected in any suitable manner to flexible supporting spider members 101 and 102 which are attached firmly by layers of rings 103 and 104 to the pole piece 96. Over the complete assembly, with an aperture having a slight clearance for button 100, there is placed a cover member 105 which may be of any resilient material such as rubber. Detector 15 is extremely sensitive and in order to minimize the vibrations due to skin friction an annular bead 106 is provided. This bead will form contact with the chest skin surrounding button 100 and prevent relative motion between this skin and the housing of the pick-up. Such motions might otherwise cause extraneous vibrations to be detected and transmitted to the viewing screen of cathode ray tube 21.

Figure 3:
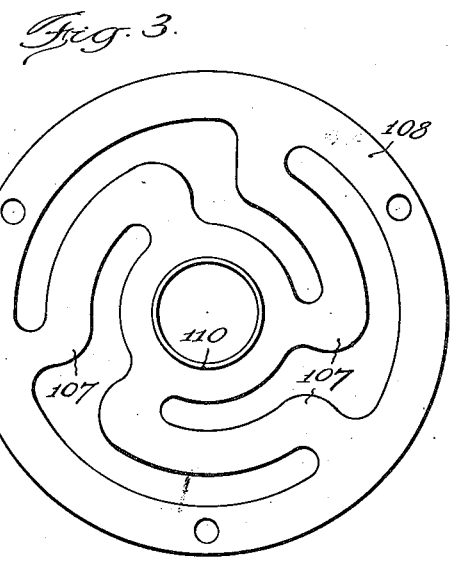
Fig. 3 is a plan of one of the supporting or suspension elements for the movable coil and chest-contact button.
Figure 2:
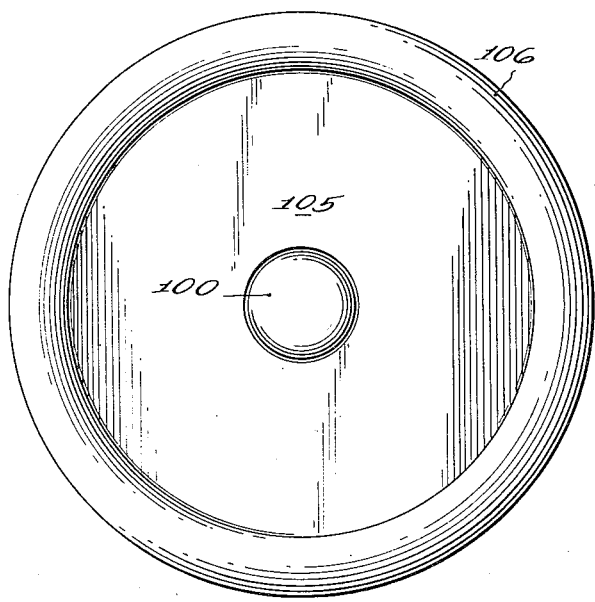
Fig. 2 is a front view.

Detector or pick-up 15 is of the electro-dynamic coil type and vibrations detected through button 100 cause coil 98 to move across the field set up in the air-gap between poles 96 and 97. The voltage generated in coil 98 is taken off by suitable leads (not shown). Spider members 101 and 102 are made of extremely thin material and may be of metal, paper, or one of the artificial resins such as Bakelite. As shown in Fig. 3, these members have arms 107 projecting inwardly from an annular portion 108 at the outer periphery of spider members 101 and 102, and form into a central annular portion 110. The supporting arms are elongated by providing each with a portion extending over an appreciable arc and concentric with the annular portions 108 and 110. By so forming supporting arms 107 they can be made of considerably greater length than the straight radial distance between annular portions 108 and 110, and will afford greater flexibility to the entire supporting spider. Thus, the body contact member can travel for a considerable distance without substantially stretching the material of the spider member or without undue resistance to movement thereof.

Further, this construction of the spider member minimizes the pick-up of vibrations other than those desired as it presents a small area outside of the body contact member 100 upon which vibrations can impinge. Spider members 101 and 102, therefore, do not act as the diaphragms of an acoustic pick-up, but form a supporting member for holding the coil 98 in the air gap and for permitting the travel of the body contact member to an appreciable distance without undue stress of the material of the spider members. These spider members may be made of any suitable material. For example, an extremely satisfactory pick-up has been made in which the spider members are of flat Bakelite of .015 inch in thickness and wherein button 100 is composed of Bakelite, machined or molded, with a thickness of .005 inch.

Having thus illustrated and described the nature of an embodiment of our invention, what we claim and desire to secure by United States Letters Patent is as follows:

1. In a dynamic type pick-up having a magnetic field and a coil positioned in said field so that vibrations of the coil produce electrical impulses through the coil, the combination comprising a portion of resilient vibration damping material having a raised chest-wall engaging rim and a recessed central web having a relatively small centrally located hole therethrough, a body contact button slightly smaller than the hole passing therethrough said button being spaced substantially from said rim and having a head of small area positioned in approximately the same plane as the crest of the rim, said button being affixed to the coil so that all vibrations of the button will produce corresponding vibrations of the coil, and resilient means for supporting the button and the coil.

2. In a dynamic type pick-up, for detecting chest wall vibrations, having a magnetic field and having a coil positioned in the magnetic field so that movements of the coil produce electric impulses, the combination comprising a supporting portion of resilient vibration absorbative material, for supporting the pick-up, having a raised chest wall engaging rim and having a recessed central web portion having a hole of small cross sectional area therethrough, a chest wall contact button slightly smaller than said hole, extending freely therethrough into approximately the same plane as the apex of the rim, said button being spaced substantially from said rim and being rigidly connected with said coil so that all vibrations of said button are transmitted to said coil and an annular spider having a central portion supporting said coil and said button, said spider being supported at its outer margin and having a plurality of arms extending from the outer portion of the spider to the central portion thereof, each arm being constructed and disposed so that its inner and outer extremities are angularly displaced from each other.

OSCAR G. SALB.
RALPH E. STURM.